United States Patent Office 3,120,219
Patented Feb. 4, 1964

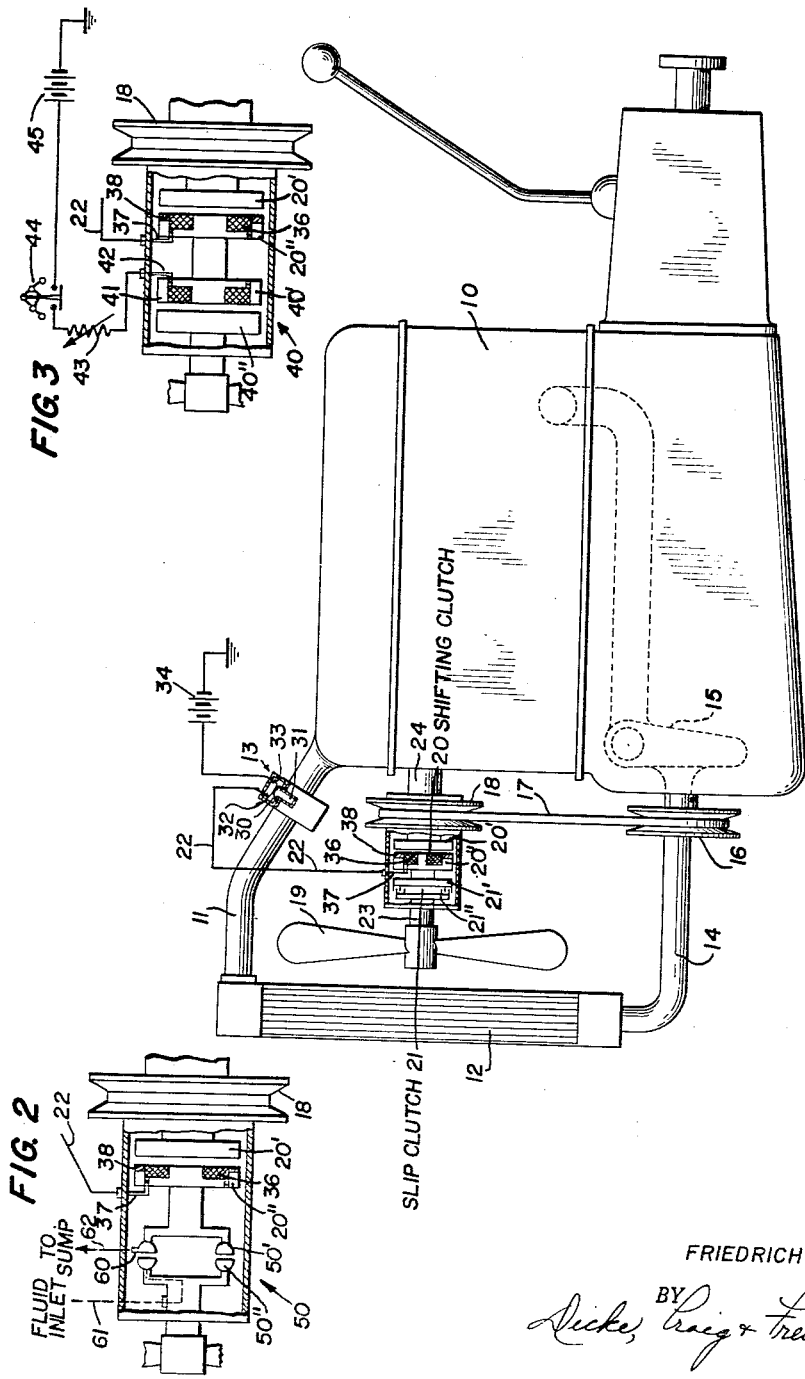

3,120,219
FAN DRIVE ARRANGEMENT
Friedrich K. H. Nallinger, Stuttgart, Germany, assignor to Daimler-Benz Aktiengesellschaft, Stuttgart-Unterturkheim, Germany
Filed May 19, 1960, Ser. No. 30,334
Claims priority, application Germany May 27, 1959
10 Claims. (Cl. 123—41.12)

The present invention relates to a fan drive for the cooling system of an internal combustion engine, especially in motor vehicles, in which the fan is driven from the internal combustion engine through a clutch or coupling adapted to be disengaged in dependence on the cooling medium temperature.

Fan drives of the type mentioned hereinabove are known in the prior art. In these prior art constructions, any suitable clutch, for example, also an electromagnetic clutch is used as the disengageable clutch which either completely disengages or completely engages the fan dependent on the temperature of the cooling medium. Such a prior art arrangement thereby entails the disadvantage that the fan may be engaged suddenly with a very high rotational speed and thereby causes an unpleasant and very distracting noise. Such prior art construction further entails the disadvantage that the fan as well as the drive parts thereof, for example, the driving belt or belts thereof have to be constructed and designed for the highest rotational speed of the engine. Consequently, with relatively lower rotational speeds the efficiency and output of the fan is relatively very poor in such prior art constuctions.

On the other hand, fan drives provided with a slip clutch, for example, of the hydrodynamic type are also known in the prior art. These prior art drives, in turn, entail the disadvantage that the fan at all times runs along with the engine, and thereby also utilizes power even with a relatively low rotational speed of the engine. Additionally, by reason of the continued running along of the fan, there arises an undesired heating of the hydraulic fluid in the fan coupling.

The present invention is concerned with the task to effectively avoid and eliminate all of the aforementioned disadvantages. This is achieved with the fan drives of the type mentioned hereinabove by arranging between the internal combustion engine and the fan, in addition to an automatically engaging and disengaging shifting clutch, a slip clutch of any known construction in series therewith which limits automatically the maximum rotational speed of the fan to a predetermined value.

The arrangement in accordance with the present invention offers the advantage that the fan which initially is engaged by the shifting clutch only when a predetermined cooling medium temperature is exceeded, cannot surpass, during operation thereof, a predetermined rotational speed by reason of the slip clutch in accordance with the present invention so that unpleasant noises are avoided with high rotational speeds of the engine. Furthermore, the fan used in accordance with the present invention may also be constructed and designed for a relatively lower rotational speed so that it also exhibits a better efficiency at such lower rotational speeds.

It is also appropriate in accordance with the present invention to connect the driving part of the shifting clutch with the crankshaft or any other shaft of the internal combustion engine either directly or indirectly, for example, by means of a belt drive, whereas the driven part of the shifting clutch is operatively connected with the driving part of the slip clutch. This may take place, for example, by arranging the driven part of the shifting clutch and the driving part of the slip clutch on a common shaft. The driven part of the slip clutch in turn then constitutes the drive for the fan. In other words, there is arranged in the torque transmission from the engine to the fan at first shifting clutch and then the slip clutch.

In accordance with one embodiment of the present invention, the shifting clutch may be constructed as an electromagnetically actuated friction clutch which is adapted to be engaged by means of a control pulse produced by a temperature sensing device arranged in the cooling medium circuit which produces the control pulse when the cooling medium exceeds a predetermined maximum temperature. Electromagnetic clutches such as illustrated, for example, in U.S. Patents 1,934,783 and 2,214,391 may be used in the arrangement of the present invention. The slip clutch, in turn, may be constructed in any suitable manner, for example, as a hydrodynamic coupling such as the viscosity coupling of U.S. Patent 2,838,244 or the torque coupling of U.S. Patents 2,902,459 and 2,902,127 with a relief valve means or as a slip ring-free, electromagnetic slip clutch, but the slip clutch is always so constructed that the secondary part thereof does not exceed a predetermined rotational speed. Both clutch and/or couplings may be arranged on a common shaft or may be provided with coaxially arranged shaft parts and may also be accommodated in a common housing.

Accordingly, it is an object of the present invention to provide a drive for a fan, especially for the cooling system of an internal combustion engine which avoids the drawbacks and shortcomings of the prior art arrangement in an effective and simple manner.

Another object of the present invention resides in the provision of a simple drive arrangement for the fan of a cooling system, especially of an internal combustion engine, which avoids unpleasant and distracting noises due to relatively high rotational speeds of the fan when suddenly engaged.

Still another object of the present invention is the provision of a fan drive which permits a design and construction of the various component parts thereof for relatively lower speeds so as to produce relatively good efficiency even at lower rotational speeds.

Still another object of the present invention resides in the provision of a fan drive arrangement including a fluid coupling in which overheating of the fluid is avoided.

A still further object of the present invention resides in the provision of a fan drive which selectively engages the fan in response to the temperature of the cooling medium and which prevents excessive speeds of the fan.

These and further objects, features and advantages of the present invention will become more obvious from the following description when taken in connection with the accompanying drawing which shows in FIGURE 1 the preferred embodiment of the present invention, FIGURE 2 the clutch arrangement of a modification of the present invention, and FIGURE 3 the clutch arrangement of a further modification.

Referring now to the drawing wherein like reference numerals designate like parts, FIGURE 1 is a side elevational view of a fan drive arrangement in accordance with the present invention, reference numeral 10 designates a water-cooled internal combustion engine. The cooling system for the internal combustion engine 10 is in communication with the radiator 12 by means of a line or pipe 11. A temperature sensitive device 13 of any suitable construction, commonly known in the art as thermostat, is arranged within the line 11. A further line or pipe 14 assumes the function of returning the cooling medium such as cooling water from the radiator 12 to the cooling medium pump 15 which is driven, as is known, from the engine 10 and thereby forces the cooling medium back into the cooling jackets of the engine block. Typically, the device 13 may include a hollow casing 31 projecting into the cooling system. The casing 31 is closed by a flexible diaphragm 30 which expands and contracts with changes in the temperature of the cooling fluid. The diaphragm is operatively connected with a movable contact 33 which cooperates with a fixed contact 32 to control connection of the battery 34 to the clutch 20 through the electric conductor 22.

The crankshaft or possibly also any other shaft of the internal combustion engine such as cam shaft or any other shaft drives the fan 19 by means of a disk pulley 16, a belt 17 and a further disk pulley 18. Of course, it is understood that any other analogous or suitable drive may be used such as a sprocket drive, etc. A selectively engageable shifting clutch 20 and a slip clutch 21 are arranged in the drive between the internal combustion engine 10 and the fan 19 which are operatively connected in series one behind the other. The shifting clutch 20 may be constructed in any suitable manner, for example, as an electromagnetically actuated friction clutch including a driving member 20' and a driven member 20'' having a friction disk 38 thereon. A coil 36 connected through contact 37 with the electric conductor 22 provides sufficient force to operatively connect the driving and driven member of clutch 20 when energized by the battery 34. The clutch 20 is thereby selectively engaged or disengaged by means of a control pulse produced in any suitable manner by the temperature sensitive device 13. The control line 22 thereby serves for transmitting the control pulse from the temperature sensitive device 13 to the shifting clutch 20. The shifting clutch 20 may thereby be so constructed that the housing thereof simultaneously forms the disk pulley 18.

Any known clutch or coupling having the required characteristics may be used as slip clutch 21 schematically shown in the drawing. For example, a hydrodynamic coupling provided with an adjustable, controllable filling such as illustrated in FIGURE 2 by clutch coupling 50 which includes a conventional driving member 50' and driven member 50''. The slip clutch however, is always so constructed that the secondary or driven member thereof automatically is unable to exceed a predetermined maximum rotational speed. This may take place in clutch 50, for example, by a suitable conventional relief valve 60 opening at a predetermined excess pressure in connection with a controllable inlet quantity to the fluid coupling, as is known in the prior art. Since the fluid medium in clutch 50, which is supplied through line 61, is under a centrifugal pressure which increases with increasing speed, the conventional relief valve utilizes this pressure to release the fluid from the clutch 50 at a predetermined speed whereby the driving connection between members 50' and 50'' is broken.

The arrangement is thereby so made that the driving part 20' of the shifting clutch 20 is operatively connected with the internal combustion engine 10 through the belt drive 16, 17 and 18 or any other suitable drive. The driven part 20'' of the shifting clutch 20, in turn, is operatively connected with the driving part 21' of the slip clutch 21 which may take place, for example, by mounting the same on a common shaft. The driven part 21'' of the slip clutch 21 in turn, drives the fan 19 directly through shaft 23.

Both clutches or couplings 20 and 21 may be arranged on a stud shaft 24 secured at the engine block of the internal combustion engine 10. Appropriately the two clutches or couplings 20 and 21 are accommodated within a common housing. The latter construction is selected especially in the case when both clutches are constructed in an analogous manner, for example, as electromagnetic clutches such as illustrated in FIGURE 3, wherein the slip clutch 40 is an electromagnetic clutch similar to the shifting clutch 20. Centrifugal governor switch 44 arranged in the circuit, including power source 45, for clutch 40 acts as a limit switch whereby the clutch is unable to exceed the desired maximum rotational speed. A conventional variable resistor 43 provides for an adjustable excitation of the clutch 40.

While I have shown and described one embodiment in accordance with the present invention it is understood that the same is not limited to the details shown and described herein but is susceptible of many changes and modifications within the spirit and scope thereof. For example, the temperature sensing device 13 could be located any place within the engine system where an indication of the temperature of the cooling medium for the engine or of another temperature proportional to the engine temperature can be obtained.

Thus, it is quite clear that the present invention is not limited to the details shown and described herein but may be varied, without departing from the scope and spirit of the present invention, in numerous ways and I, therefore, do not wish to be limited to the details shown and described herein but intend to cover all such changes and modifications as are encompassed by the scope of the appended claims.

I claim:

1. A fan drive for the cooling system of an internal combustion engine, especially in motor vehicles, comprising fan means, and means drivingly connecting said fan means with said internal combustion engine including automatically engageable and disengageable shifting clutch means and slip clutch means operatively connected in series with said shifting clutch means between said engine and said fan means for automatically limiting the rotational speed of said fan means to a predetermined maximum value, each of said clutch means having a driving part and a driven part, the driving part of said shifting clutch means being operatively connected to said internal combustion engine, the driven part of said shifting clutch means being operatively connected with the driving part of said slip clutch means, and the driven part of said slip clutch means being operatively connected with said fan means.

2. A fan drive for the cooling system of an internal combustion engine according to claim 1, wherein said engine includes a crankshaft, and wherein the driving part of said shifting clutch means is offset with respect to said crankshaft.

3. A fan drive for the cooling system of an internal combustion engine according to claim 1, wherein said shifting clutch means is constructed as an electromagnetically actuatable friction clutch, and includes temperature responsive sensing means for producing a control pulse with the cooling medium of said cooling system exceeding the predetermined temperature to thereby control said friction clutch by said control pulse.

4. A fan drive for the cooling system of an internal combustion engine according to claim 3, wherein said slip clutch means is constructed as viscosity clutch.

5. A fan drive for the cooling system of an internal combustion engine according to claim 3, wherein said slip clutch means is constructed as hydrodynamic coupling provided with automatically controlled liquid filling.

6. A fan drive for the cooling system of an internal combustion engine according to claim 3, wherein said slip clutch means is constructed as an electromagnetic slip clutch having an adjustable excitation thereof.

7. A fan drive for the cooling system of an internal combustion engine according to claim 1, wherein said shifting clutch means and said slip clutch means are arranged on a common shaft.

8. A fan drive for the cooling system of an internal combustion engine according to claim 7, wherein said clutch means are accommodated in a common housing.

9. A fan drive for the cooling system of an internal combustion engine according to claim 1, wherein said two clutch means are provided with coaxial shaft parts.

10. A fan drive for the cooling system of an internal combustion engine according to claim 1, wherein both of said clutch means are accommodated in a common housing.

References Cited in the file of this patent

UNITED STATES PATENTS

| | | |
|---|---|---|
| 1,934,783 | Arterburn | Nov. 14, 1933 |
| 2,214,391 | Weydell | Sept. 10, 1940 |
| 2,611,347 | Nallinger | Sept. 23, 1952 |
| 2,802,459 | Herbenar | Aug. 13, 1957 |
| 2,820,440 | Jacobs | Jan. 21, 1958 |
| 2,838,244 | Oldberg | June 10, 1958 |
| 2,902,127 | Hardy | Sept. 1, 1959 |
| 2,917,937 | Dodge | Dec. 22, 1959 |

FOREIGN PATENTS

| | | |
|---|---|---|
| 510,268 | Belgium | Apr. 15, 1952 |
| 1,196,766 | France | May 25, 1929 |